(12) United States Patent
Loewenstein et al.

(10) Patent No.: US 10,125,688 B2
(45) Date of Patent: Nov. 13, 2018

(54) GAS EJECTION DUCT WITH ACOUSTIC TREATMENT, AN AIRCRAFT, AND A METHOD OF FABRICATING SUCH A DUCT

(71) Applicant: AIRBUS HELICOPTERS, Marignane (FR)

(72) Inventors: Philippe Loewenstein, Sausset les Pins (FR); Remi Herfort, Verneuil-sur-Seine (FR)

(73) Assignee: AIRBUS HELICOPTERS, Marignane, Cedex (FR)

( * ) Notice: Subject to any disclaimer, the term of this patent is extended or adjusted under 35 U.S.C. 154(b) by 52 days.

(21) Appl. No.: 15/298,550

(22) Filed: Oct. 20, 2016

(65) Prior Publication Data
US 2017/0107909 A1   Apr. 20, 2017

(30) Foreign Application Priority Data
Oct. 20, 2015   (FR) ...................................... 15 02204

(51) Int. Cl.
*F02C 7/24*   (2006.01)
*B33Y 10/00*   (2015.01)
(Continued)

(52) U.S. Cl.
CPC .............. *F02C 7/24* (2013.01); *B22F 3/1055* (2013.01); *B33Y 10/00* (2014.12); *B33Y 80/00* (2014.12);
(Continued)

(58) Field of Classification Search
CPC ........................................................ F02C 7/24
(Continued)

(56) References Cited

U.S. PATENT DOCUMENTS 3,542,152 A * 11/1970 Oxx, Jr. ................. B64D 33/02
                                                       181/214
4,240,252 A   12/1980 Sargisson et al.
(Continued)

FOREIGN PATENT DOCUMENTS

EP   1391597 A2   2/2004
EP   1391597 A3   9/2006
(Continued)

OTHER PUBLICATIONS

European Search Report for European Application No. EP 16 19 1420, Completed by the European Patent Office on Feb. 23, 2017, 5 Pages.
(Continued)

*Primary Examiner* — Jeremy Luks
(74) *Attorney, Agent, or Firm* — Brooks Kushman P.C.

(57) ABSTRACT

A gas ejection duct with acoustic treatment provided with at least one wall referred to as an "acoustic" wall for coming into contact with the gas. The acoustic wall comprises an inner skin and an outer skin that are spaced apart at least in part by a space, the acoustic wall including at least one internal mesh in the space, the mesh defining a plurality of cavities. Each cavity has the shape of a parallelepiped, each mesh extending longitudinally in a direction referred to as the "fabrication" direction that presents an acute angle greater than or equal to a predetermined angle relative to a horizontal plane, each of the inner and outer skins presenting an acute angle of inclination greater than or equal to the at least one predetermined angle relative to the horizontal plane.

20 Claims, 5 Drawing Sheets

(51) Int. Cl.
    *B33Y 80/00*     (2015.01)
    *B22F 3/105*     (2006.01)
    *C22C 19/05*     (2006.01)
    *F01D 25/00*     (2006.01)
    *F01D 25/30*     (2006.01)
    *G10K 11/16*     (2006.01)
    *F02K 1/34*     (2006.01)
    *F02K 1/82*     (2006.01)

(52) U.S. Cl.
    CPC ............ *B64D 33/06* (2013.01); *C22C 19/056* (2013.01); *F01D 25/005* (2013.01); *F01D 25/30* (2013.01); *F02K 1/827* (2013.01); *G10K 11/161* (2013.01); *F05D 2220/32* (2013.01); *F05D 2260/963* (2013.01); *Y02T 50/671* (2013.01)

(58) Field of Classification Search
    USPC .................................................. 181/213, 292
    See application file for complete search history.

(56) References Cited

U.S. PATENT DOCUMENTS

| | | | |
|---|---|---|---|
| 4,452,335 A | 6/1984 | Mathews et al. | |
| 4,693,201 A | 9/1987 | Williams et al. | |
| 8,132,756 B2 | 3/2012 | Huber et al. | |
| 8,763,751 B2* | 7/2014 | Starobinski | B64D 33/06 |
| | | | 181/213 |
| 8,955,643 B2* | 2/2015 | Liu | F02C 7/045 |
| | | | 181/213 |
| 9,062,610 B2* | 6/2015 | Morvant | F02K 1/34 |
| 2007/0256889 A1* | 11/2007 | Yu | F02K 1/04 |
| | | | 181/214 |
| 2010/0115964 A1* | 5/2010 | Kirby | F01D 17/105 |
| | | | 60/785 |
| 2015/0114005 A1* | 4/2015 | Hicklin | F01D 11/005 |
| | | | 60/796 |
| 2015/0367953 A1* | 12/2015 | Yu | B64D 33/06 |
| | | | 181/222 |
| 2016/0376930 A1 | 12/2016 | Hosoya et al. | |
| 2017/0292453 A1* | 10/2017 | Rami | F02C 7/24 |

FOREIGN PATENT DOCUMENTS

| | | |
|---|---|---|
| EP | 1998003 A2 | 12/2008 |
| EP | 1998003 A3 | 6/2012 |
| EP | 2594480 | 5/2013 |
| EP | 2644501 | 10/2013 |
| EP | 2865947 | 4/2015 |
| EP | 2868869 A1 | 5/2015 |
| EP | 3073075 | 9/2016 |
| FR | 2712640 | 5/1995 |
| FR | 2929336 | 10/2009 |
| WO | 2015098148 | 7/2015 |
| WO | 2015098148 A1 | 7/2015 |

OTHER PUBLICATIONS

French Search Report for French Application No. FR 1502204, Completed by the French Patent Office, dated Jun. 5, 2016, 7 Pages.

* cited by examiner

GAS EJECTION DUCT WITH ACOUSTIC TREATMENT, AN AIRCRAFT, AND A METHOD OF FABRICATING SUCH A DUCT

CROSS REFERENCE TO RELATED APPLICATION

This application claims priority to French patent application No. FR 15 02204 filed on Oct. 20, 2015, the disclosure of which is incorporated in its entirety by reference herein.

BACKGROUND OF THE INVENTION (1) Field of the Invention

The present invention relates to a gas ejection duct with acoustic treatment, and to an aircraft having such a duct. The invention also relates to a method of fabricating such a duct.

The invention lies in the technical field of gas ejection ducts for aircraft.

(2) Description of Related Art

An aircraft usually has an engine contributing to providing the aircraft with propulsion or indeed lift. For example, a rotorcraft may have a fuel burning engine that rotates a rotor contributing at least to providing the aircraft with lift.

The engine generates exhaust gas that is expelled out from the aircraft by an ejection system. On an aircraft, a gas ejection system may include a duct commonly referred to as a "nozzle" for discharging exhaust gas out from the aircraft. An engine may also include a gas takeoff duct taking gas to other equipment of the aircraft.

The engines used in aviation can produce noise that is painful for a human to hear. Gas ejection systems are therefore sometimes acoustically treated in an attempt to reduce the noise they emit, in particular in a frequency range that is painful to hear for the human ear.

The gas ejection systems of aircraft also need to satisfy mechanical strength requirements relating to the surrounding environment and to satisfy the requirements of official aviation regulatory agencies.

In order to reduce emitted noise, a mechanical system may have walls provided with small cells that are locally open to the outside and that form so-called "Helmholtz" resonators. Such cells are referred to as "cavities" for convenience.

Helmholtz resonance is a physical phenomenon that appears when a sound wave travels close to a cavity in communication with the outside via an opening. The original sound wave penetrates into the cavity through the opening, and is then reflected inside the cavity so as to form a wave that is phase shifted, while remaining an image of the original acoustic wave. The original acoustic wave, when superposed on the phase shifted wave, leads to a resulting wave that is attenuated. The level of sound emission is thus decreased.

Such cavities therefore operate in the presence of acoustic waves such as a vibrating system having one degree of freedom with its mass associated with the dimensions of the cavities, with its stiffness associated with the volume of air in each cavity, and with its damping associated with the resistance opposed by the outside medium to generating acoustic waves.

On an aircraft, a wall provided with resonators making use of this principle has a core defining small cavities of hexagonal section in application of the principle of the Helmholtz resonator. Such a cavity is then in the form of a prism of hexagonal section extending in elevation from an open base towards an open top. Given this shape, the core is referred to as a "honeycomb" layer.

The core is then brazed to a rear metal sheet that closes the base of each prism. Furthermore, a perforated skin rests on the tops of the prism so that each cavity can communicate via a plurality of perforations with the ejected gas.

Thus, a helicopter gas ejection prototype with acoustic treatment includes sheets made of titanium. Sheets are shaped and welded together to form a wall having cavities of hexagonal section or cavities of large dimensions. The wall also has a perforated skin attached to the cavities.

That gas ejection prototype provides cavities presenting dimensions that are different. As a result, the use of cavities with different volumes serves to attenuate noise over a wider frequency range. Nevertheless, making different cavities turns out to be difficult when using metal sheets that are brazed to one another.

In addition, assembling sheets requires numerous fabrication operations. In particular, such assembly can require fine metal sheets to be brazed together, which is difficult.

Consequently, making a gas ejection duct, and in particular a nozzle, that is provided with such acoustic treatment means can be difficult and/or expensive.

Documents FR 2 712 640, FR 2 929 336, and EP 2 865 947 are remote from the problem of the invention and are mentioned purely by way of information.

Document FR 2 712 640 describes a structure having a surface with low aerodynamic drag. That structure has cells opening out to an outside medium via one opening and to a channel via another opening.

Document FR 2 929 336 relates to a device having plane jets used to reduce the noise generated by an aircraft jet engine. The device has a wall surrounding a stream of gas ejected by a jet engine. Ducts are distributed at a periphery of a downstream end of the wall in order to eject a jet of fluid in the form of a sheet.

Document EP 2 865 947 provides a damper in order to reduce acoustic pulsations in a gas turbine chamber. That damper has a cavity opening out to a bent tube in communication with the chamber.

Documents EP 1 998 003, U.S. Pat. No. 4,240,252, U.S. Pat. No. 4,452,335, WO 2015/098148, and EP 1 391 597 are also known.

BRIEF SUMMARY OF THE INVENTION

An object of the present invention is thus to provide a gas ejection duct with acoustic treatment that presents a structure capable of enabling it to be made in optimized manner.

According to the invention, a gas ejection duct with acoustic treatment is provided with at least one mechanical member, the mechanical member having at least one wall referred to as an "acoustic" wall for coming into contact with the gas, the acoustic wall having an inner skin and an outer skin that are spaced apart at least in part by a space, the acoustic wall including at least one internal mesh arranged in the space, the mesh defining a plurality of cavities, each cavity extending in the thickness direction from the inner skin to the outer skin, the inner skin being for coming into contact with the gas, the inner skin having perforations, each cavity communicating with at least one perforation.

The gas ejection duct with acoustic treatment may be a nozzle directing the gas to the outside of the aircraft, or it may be a takeoff pipe directing gas to at least one other piece of equipment of an aircraft.

Each cavity is in the shape of a parallelepiped.

In a variant, seeking to optimize fabrication of the duct, the gas ejection duct with acoustic treatment extends in elevation from a base to a top, the inner wall and the outer wall and each mesh extend in elevation relative to a fabrication plane referred to as the "horizontal" plane that is tangential to the base, each mesh may extend in elevation in a direction referred to as the "fabrication direction" presenting an acute angle greater than or equal to a predetermined angle relative to the horizontal plane, and each of the inner and outer walls may present an acute angle of inclination relative to the horizontal plane that is greater than or equal to the predetermined angle.

The term "each presenting an angle of inclination" means that each surface of each member in question presents the specified angle of inclination.

The term "in elevation" refers to a direction that presents an acute or zero angle relative to gravity during fabrication of the wall in question.

Consequently, the term "longitudinal" refers to a direction which a cavity extends going from the bottom skin towards the top skin. The term "transverse" refers to a direction substantially orthogonal to a direction in elevation and to a longitudinal direction.

Consequently, the gas ejection duct with acoustic treatment may be made in accordance with the invention by performing a laser sintering method, said gas ejection duct with acoustic treatment being made in elevation layer by layer from a base towards a top by repeating the fowling steps:

using a roller to deposit a layer of material such as a metal powder;

consolidating said layer locally, by using a laser; and lowering a tray supporting the gas ejection duct acoustic treatment being fabricated in order to deposit the following layer.

When the gas ejection duct with acoustic treatment has been finished, the gas ejection duct with acoustic treatment is extracted from the fabrication device in order to remove the powder that surrounds it.

Three-dimensional printing technology, and in particular sintering a powder with a laser, is advantageous because of its relative simplicity. This technology enables parts of relatively complex shape to be made with fabrication costs that are reasonable.

Nevertheless, this technology is not always easy to implement.

Thus, in the present invention, an acoustic wall of a gas ejection duct with acoustic treatment presents Helmholtz resonators that are in the shape of parallelepipeds and that are not of honeycomb shape. This innovative parallelepiped shape enables the mesh to be fabricated in elevation and avoids using surfaces that are substantially horizontal, which surfaces are impossible to fabricate with a laser sintering method. This parallelepiped shape also optimizes the acoustically treated surface by enabling an unlimited number of cavities to be aligned transversely and in elevation without loss of treated surface area.

In addition, the parallelepiped shape can be used to attenuate soundwaves that are very painful to hear for the human ear, at a frequency close to 5000 hertz (Hz).

In addition, the cavities of a mesh lie in a plane that extends transversely and in elevation, presenting an acute angle greater than or equal to a predetermined angle relative to a horizontal plane.

Specifically, the Applicant has observed that a wall presenting an angle that is too small relative to a horizontal plane cannot be fabricated by laser sintering. Specifically, such an angle does not enable the powder of a layer to be kept supported on the preceding layer.

Consequently, the other elements of the gas ejection duct with acoustic treatment and in particular the inner skin and the outer skin of an acoustic wall also present an angle of inclination that is acute, being greater than or equal to said predetermined angle.

Furthermore, the gas ejection duct with acoustic treatment can be made by laser sintering using a strong metal material.

In addition, fabrication of an article by laser sintering requires the removal of powder residue, and that presents a problem in the presence of cavities. The perforations in the inner skin can nevertheless contribute to removing residue of the powder that has been used for fabrication, and can also serve to drain the gas ejection duct with acoustic treatment.

Consequently, the gas ejection duct with acoustic treatment can satisfy acoustic requirements because of the presence of innovative cavities, can satisfy the requirements of regulatory agencies (drainage, mechanical strength, . . . ), can satisfy the requirements necessary for the mechanical strength of the gas ejection duct with acoustic treatment in given environment conditions (temperature, pressure, . . . ), and finally can satisfy design requirements for laser sintering a metal powder (skin thicknesses, angles relative to the vertical, . . . ).

The gas ejection duct with acoustic treatment may also include one or more of the following characteristics.

Thus, the determined angle may optionally be equal to 45 degrees.

In addition, each tangent to either one of said skins that is arranged in a plane perpendicular to the horizontal plane presents a said angle of inclination.

Consequently, each surface of the walls present the required angle of inclination.

Furthermore, and by way of example, said cavities of a mesh are arranged in elevation one above another, and transversely one beside another.

The mesh is in the form of a plane of thickness equal to the thickness of the cavities in a longitudinal direction. This arrangement enables the mesh to be made easily by laser sintering.

In addition, each cavity is defined in elevation by a partition referred to as "top" partition and a partition referred to as "bottom" partition, each cavity being defined transversely by a partition referred to as a "left side" partition and a partition referred to as a "right side" partition, each extending in elevation from the bottom partition to the top partition, each cavity being defined transversely in thickness by a non-perforated portion of the outer skin and a perforated portion of the inner skin.

Each cavity is then defined by six faces, namely a top partition substantially parallel to a bottom partition, a left side partition substantially parallel to a right side partition, and a front non-perforated portion of the outer skin substantially parallel to a rear perforated portion of the inner skin.

Each of said partitions is optionally rectangular.

Furthermore, each cavity may have the shape of a non-rectangular parallelepiped, each of the bottom and top partitions presenting an angle not equal to 90 degrees relative to the left side partition or the right side partition.

In contrast, and like the mesh and also the inner and outer skins, each partition presents an angle lying in the range 45 degrees to 90 degrees relative to a horizontal plane.

In addition, at least one said partition of a cavity presents a drain opening opening out to the outside of the cavity.

The gas ejection duct with acoustic treatment thus contains openings enabling the gas ejection duct with acoustic treatment to be drained.

In particular, each cavity can communicate with each transversely adjacent cavity via an opening to enable powder to escape after fabrication. Two transversely adjacent cavities thus share a common side wall, the left side wall of one cavity representing the right side wall of the other cavity. The side wall may then present a drain opening.

This characteristic is not obvious in the context of applying the Helmholtz principle. Nevertheless, the Applicant has found that a side partition with a limited opening still enables a cavity to be obtained that presents good acoustic performance.

Likewise, the gas ejection duct with acoustic treatment may include at least one skin having at least one drain orifice opening out to the outside of the gas ejection duct with acoustic treatment.

The gas ejection duct with acoustic treatment then contains internal holes of the drainage orifice type that makes drainage possible. For example, the space present between an inside skin and an outside skin leads to at least one drainage orifice provided in the inside skin or the outside skin.

In addition, the acoustic wall may be made out of a variety of materials, and in particular out of materials compatible with the laser sintering method, which is also known as additive layer manufacturing (ALM).

It is possible to use titanium 6242.

Likewise, the acoustic wall may be made out of the NiCr19Fe19Nb5Mo3 material.

This material corresponds to a material known under the trademark Inconel 718. The material used for fabricating the gas ejection duct with acoustic treatment may thus be Inconel 718 powder, thus making it possible to satisfy requirements for mechanical strength in the external environment around the gas ejection duct with acoustic treatment while using thicknesses that are small.

Thus, at least one of said inner and outer walls may present thickness of less than one millimeter.

The term "thickness" represents the smallest dimension of a skin.

Furthermore, each perforation may be present a diameter that is less than or equal to four millimeters, and that is of millimeter order.

Likewise, the above-described openings and orifices optionally present a diameter less than or equal to four millimeters.

The Applicant has found that making a hole having a diameter greater than four millimeters in a plane that extends in elevation is difficult if not impossible.

Consequently, each cavity optionally communicates with at least four perforations having a maximum diameter of 1.5 millimeters.

The cavities are covered in a perforated inner skin having perforations with a diameter of 1.5 millimeters so as to enable a Helmholtz resonance phenomenon to occur at a calculated frequency of 5000 Hz. This frequency is determined on the basis of the volume of the cavities, of the speed of sound, and of the number and the diameter and the depth of the perforations.

In addition, the gas ejection duct with acoustic treatment may be a nozzle, each mechanical member being selected from a list comprising a skirt, a central cone, and an arm connecting said skirt to the central cone.

By way of example, the gas ejection duct with acoustic treatment may be made on the basis of the Tigre® helicopter nozzle by incorporating acoustic walls of the invention in the skirt, in the central cone, and in the arms of the nozzle.

Furthermore, the invention provides an aircraft having a gas ejection duct with acoustic treatment of the type described above.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements present in more than one of the figures are given the same references in each of them.

DETAILED DESCRIPTION OF THE INVENTION

It should be observed that three mutually orthogonal directions X, Y, and Z are shown in some of the figures.

The direction X is said to be longitudinal. Another direction Y is said to be transverse. Finally, a third direction Z is said to be in elevation, and corresponds to the height dimensions of the structures described.

Figure 1:
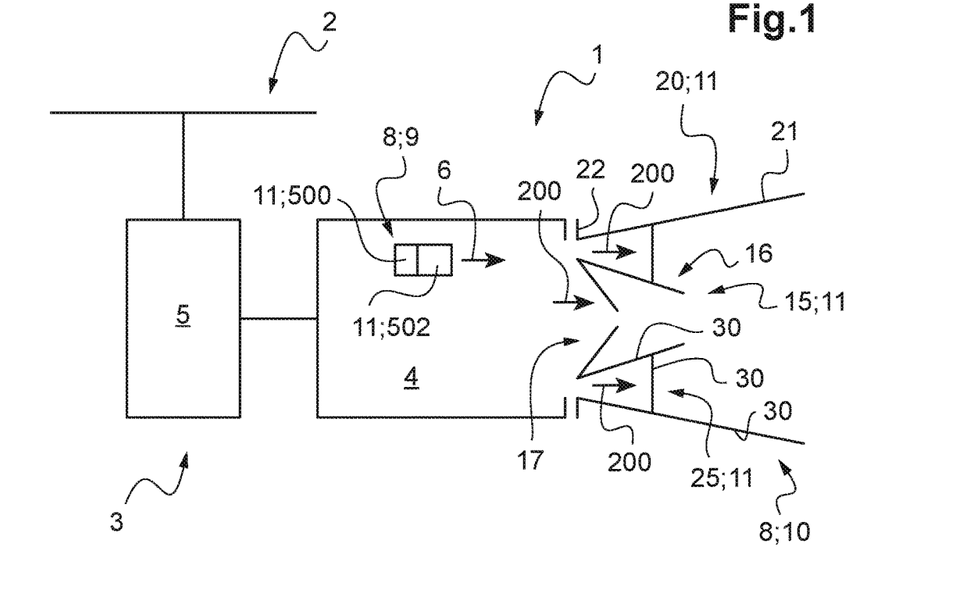
FIG. 1 is a view of an aircraft of the invention.

FIG. 1 shows an aircraft 1 of the invention.

This aircraft 1 has a power plant 3 having at least one engine 4. For example, the engine acts via a main gearbox 5 to drive a rotor 2 that participates at least to providing the aircraft with lift. The engine 4 may be a fuel burning engine ejecting gas 200, such as piston engine or a turboshaft engine.

In order to discharge gas from the engine, the aircraft 1 is provided with a gas ejection duct 8 with acoustic treatment.

Such a gas ejection duct 8 with acoustic treatment may be a gas ejection nozzle 10 with acoustic treatment directing the gas towards the outside of the aircraft, e.g. downstream from an expansion turbine of a turboshaft engine.

In addition, a gas ejection duct 8 with acoustic treatment may be in the form of a gas takeoff duct for taking off gas from the engine 4 and directing the gas to at least one other piece of equipment 6 of the aircraft, e.g. such as an air conditioning system. For example, the gas is taken off from a gas generator of a turboshaft engine.

The gas ejection duct 8 with acoustic treatment comprises at least one mechanical member 11. This mechanical member 11 is acoustically treated in order to reduce the emission of noise when exhausting gas 200.

Figure 10:
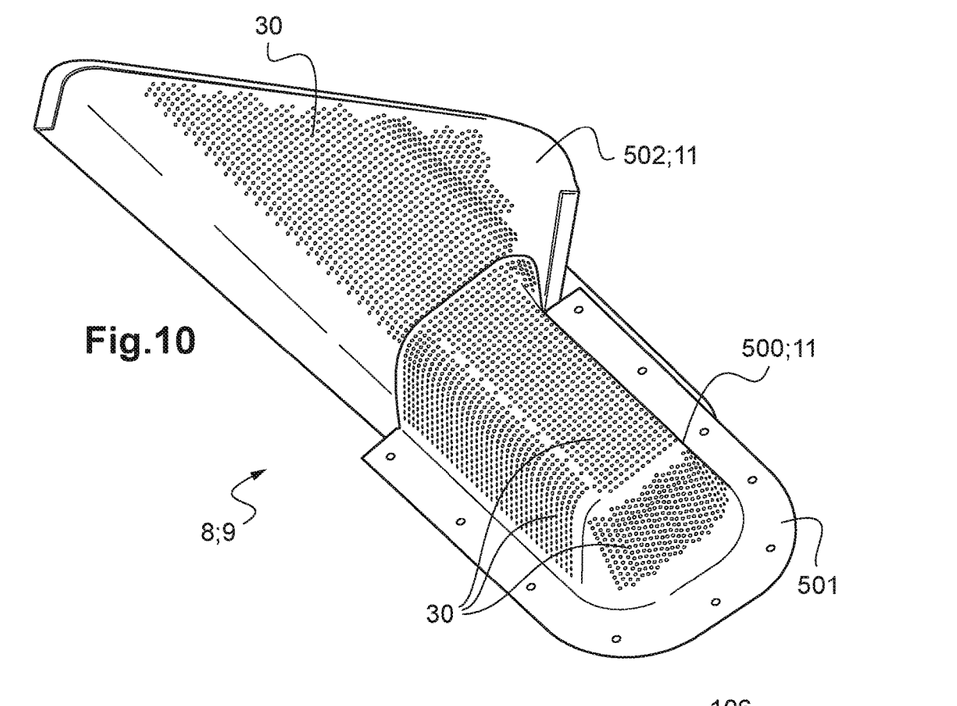
FIG. 10 is a view of a gas ejection duct with acoustic treatment of the type including a gas takeoff duct.

By way of example, the takeoff duct 9 has a bend 500 followed by a diffuser 502.

Figure 2:
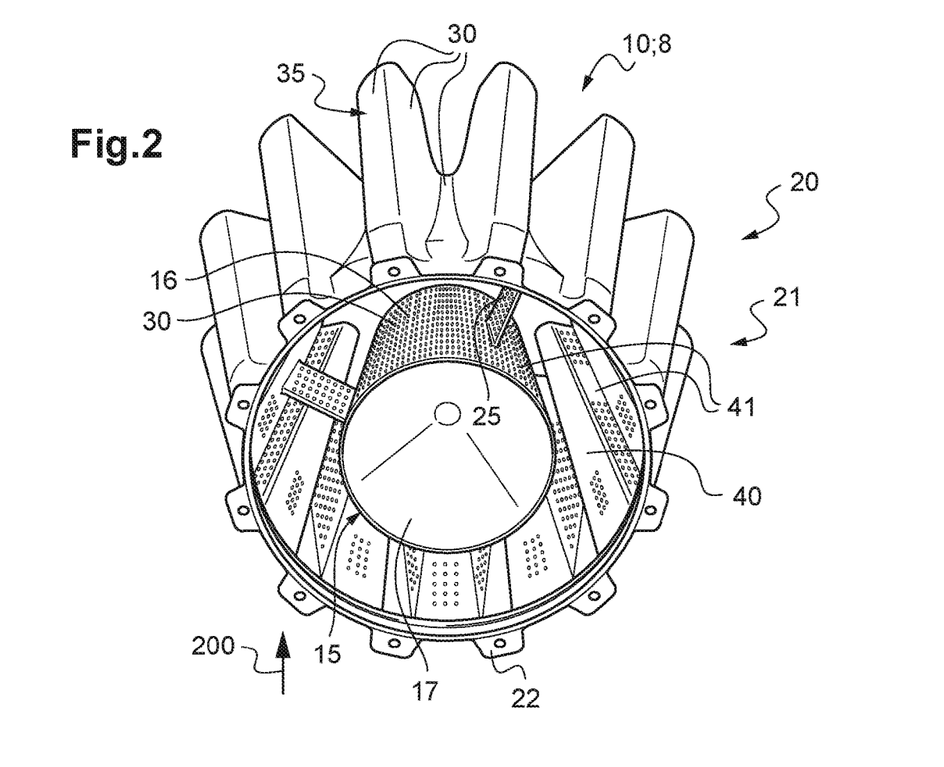
FIG. 2 is a three-dimensional view of a gas ejection duct with acoustic treatment of the type comprising a gas ejection nozzle with acoustic treatment.

In addition and by way of example, the gas ejection nozzle 10 with acoustic treatment may be provided with a skirt 20. The skirt 20 is provided with a diverging member 21 secured to a flange 22. The flange 22 may be bolted to the engine 4, for example. Such a diverging member 21 may then represent an acoustically treated mechanical member 11.

The gas ejection nozzle 10 with acoustic treatment is also provided with a central cone 15 that may represent an acoustically treated mechanical member 11. By way of example, the central cone may comprise an outer converging member 16 that surrounds an inner converging member 17. The inner converging member is then connected to the base of the outer converging member 16.

In addition, the gas ejection nozzle 10 with acoustic treatment is also provided with a plurality of arms 25, each connecting the outer converging member 16 of the central cone 15 to the diverging member 21 of the skirt 20. By way of example, at least one arm 25 extends radially and may represent an acoustically treated mechanical member 11.

FIG. 2 is a three-dimensional view of a gas ejection duct 8 with acoustic treatment comprising a gas ejection nozzle 10 with acoustic treatment of the invention.

Independently of the nature of the gas ejection duct 8 with acoustic treatment, each acoustically treated mechanical member presents an innovative acoustic wall 30. Such an acoustic wall 30 has an outer skin 35 and an inner skin 40, the inner skin 40 necessarily facing a passage 201 through which the gas 200 passes. This inner skin 40 presents perforations 41 for passing an acoustic wave generated by the flow of gas 200.

The gas ejection duct 8 with acoustic treatment, and in particular the acoustic wall 30, may be made out of the NiCr19Fe19Nb5Mo3 material. Other materials may be envisaged.

Figure 3:
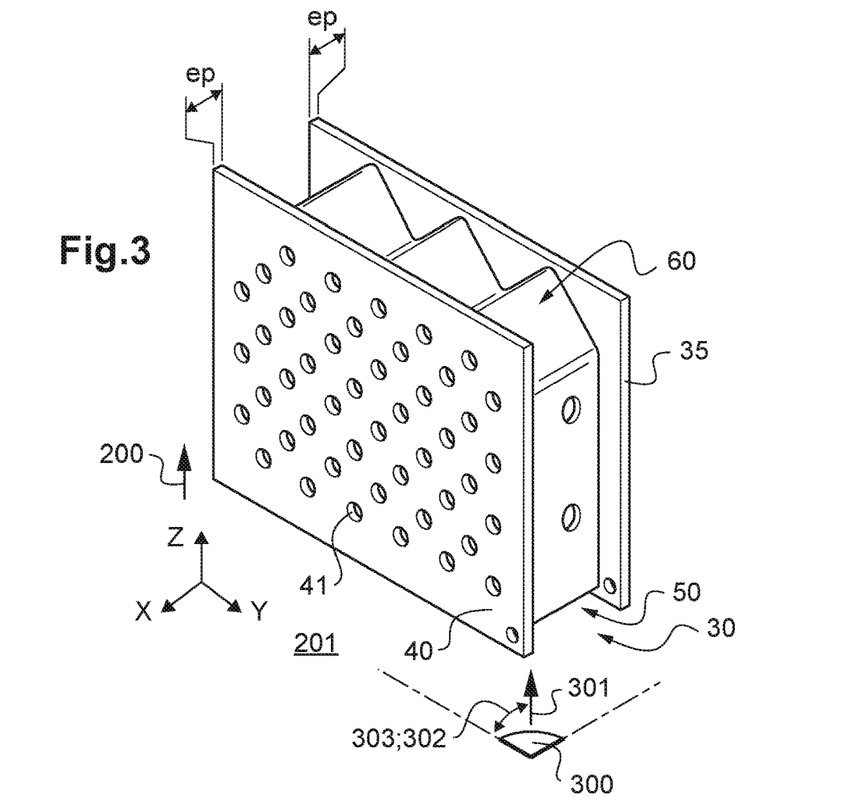
FIG. 3 is a view of a portion of an acoustic wall.

FIG. 3 is a three-dimensional view of an acoustic wall 30.

As mentioned above, the acoustic wall 30 presents an outer skin 35 and an inner skin 40.

The outer skin 35 and the inner skin 40 may locally form a single common skin.

Nevertheless, the outer skin 35 and the inner skin 40 are also spaced apart at least locally by an internal space 50. Under such circumstances, a mesh 60 is arranged in this space 50.

The mesh 60 defines cavities that are not visible in FIG. 3, each cavity representing a Helmholtz resonator. Under such circumstances, each cavity communicates via perforations 41 with a passage 201 passing the gas.

In order to enable the gas ejection duct 8 with acoustic treatment to be fabricated from the bottom up by laser sintering, the mesh 60 of an acoustic wall extends in elevation in a direction referred to as the "fabrication" direction 301. This fabrication direction 301 presents an acute angle 302 relative to a horizontal plane 300 that is greater than or equal to a predetermined angle. This horizontal plane represents the plane on which the first layer of powder is deposited during fabrication.

Likewise, both the inner skin 40 and the outer skin 35 present an acute angle of inclination 303 relative to the horizontal plane 300 that is greater than said predetermined angle.

Figure 4:
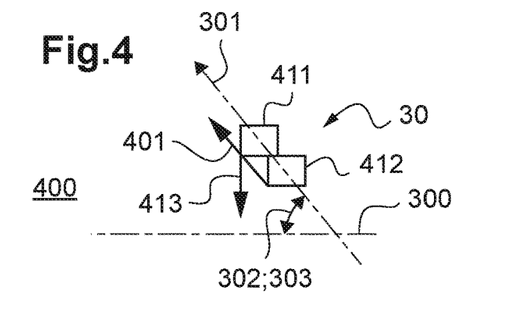
FIG. 4 is a view explaining the inclination and the angle that are authorized for the inner and outer skins, and also for the mesh.

In general, and with reference to FIG. 4, every surface of the gas ejection duct 8 with acoustic treatment extends upwards in a direction that presents at least said predetermined angle with the horizontal plane 300.

Specifically, when a layer of powder referred to as the "higher" layer 411 is deposited on a layer referred to as the "lower" layer 412, the higher layer 411 runs the risk of collapsing under its own weight along arrow 413. Nevertheless, the Applicant has observed that as from a predetermined angle, the higher layer 411 can remain on the lower layer 412.

By way of example, such a predetermined angle may be 45 degrees.

Under such circumstances, each of the outer and inner skins 35 and 40 has a tangent 401 arranged in a plane 400 that is perpendicular to the horizontal plane 300. This tangent 401 then presents an angle of inclination 303 relative to the horizontal plane 300 that is greater than or equal to the predetermined angle.

Figure 5:
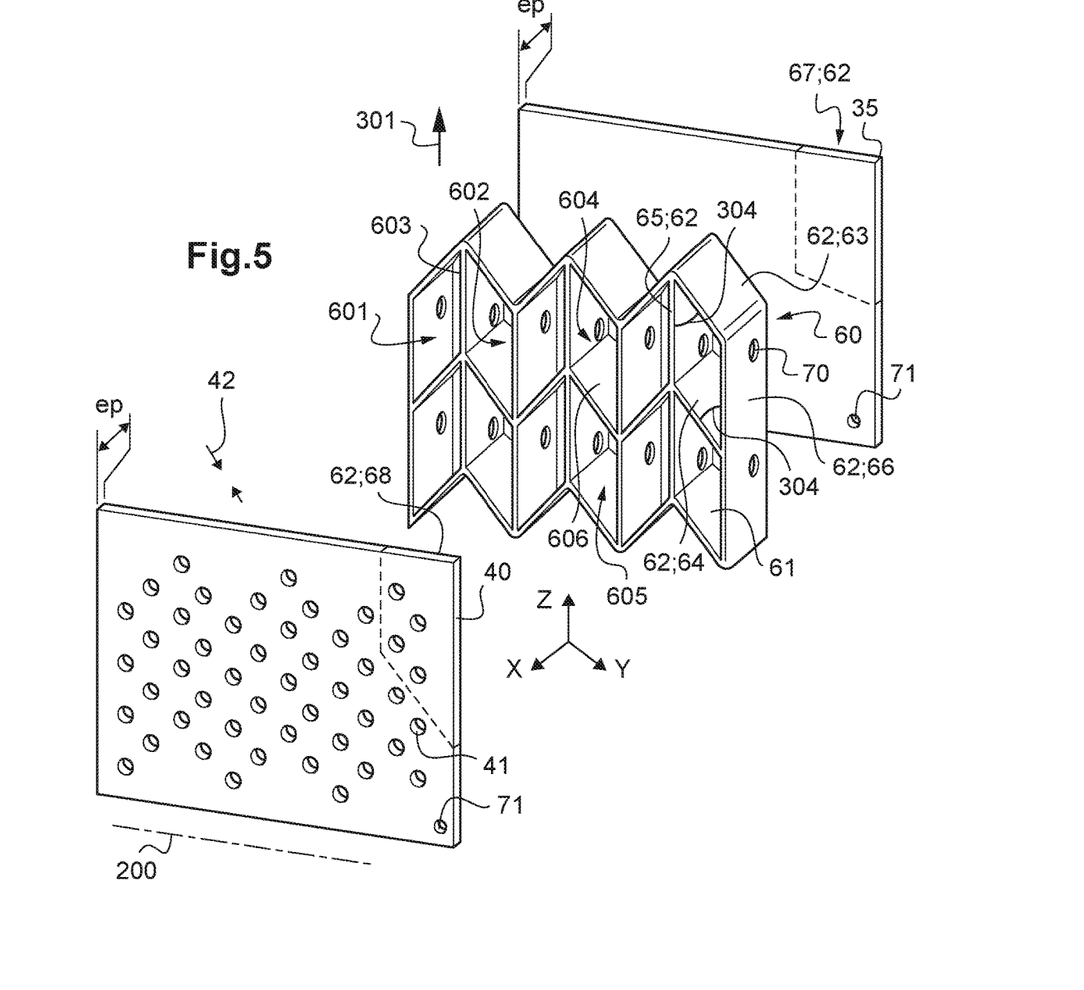
FIG. 5 is an exploded view of a portion of an acoustic wall showing cavities.

FIG. 5 is an exploded view of an acoustic wall 30 serving to show the internal mesh 60.

The mesh 60 thus presents a plurality of cavities 61 extending transversely from the outer skin 35 towards the inner skin 40.

Each cavity 61 is defined by six substantially plane faces.

Thus, a cavity is defined in elevation in an elevation direction Z firstly by a partition 62 referred to as the "top" partition 63 and secondly by a partition 62 referred to as the "bottom" partition 64. The top partition 63 is parallel to the bottom partition 64.

In addition, the cavity 61 is defined transversely in a transverse direction Y firstly by a partition 62 referred to as the "left side" partition 65 and secondly by a partition 62 referred to as the "right side" partition 66. The left side partition 65 is parallel to the right side partition 66. In addition, each of the left and right side partitions 65 and 66 extends upwards in elevation in the wall fabrication direction from the bottom partition 64 to the top partition 63.

Finally, each cavity 61 is defined longitudinally in thickness in a longitudinal direction X firstly by a plane face represented by a non-perforated portion 67 of the outer skin 35, and secondly by a plane face represented by a perforated portion 68 of the inner skin 40.

By construction, each cavity then has an innovative parallelepiped shape.

In particular, each partition may be rectangular.

Nevertheless, each cavity 61 may be in the form of a non-rectangular parallelepiped. Both the bottom partition 64 and the top partition 63 present an acute angle 304 that is not equal to 90° relative to the left side partition 65 or the right side partition 66.

In addition, the cavities 61 of a mesh 60 are arranged in elevation one above another, and transversely one beside another.

Consequently, two transversely adjacent cavities 601 and 602 possess a common side partition 603.

Likewise, two cavities that are adjacent in elevation are arranged one above the other. A cavity referred to as the "higher" cavity 604 then lies above a cavity referred to as the "lower" cavity 605. Under such circumstances, two adjacent cavities possess a common partition 606 that constitutes a top partition for the lower cavity 605 and a bottom partition for the higher cavity 604.

In addition, the left side partition of the higher cavity is in alignment with the left side partition of the lower cavity, and the right side partition of the higher cavity is situated in alignment with the right side partition of the lower cavity. The side partitions of a row of cavities arranged one above another thus form a plane plate extending in elevation.

Furthermore, by construction, each cavity has an innovative parallelepiped shape.

In order to enable powder residue to be removed during fabrication of the acoustic wall, at least one partition 62 of a cavity 61 has a drain opening 70 leading to outside the cavity 61.

For example, each side partition 65, 66 presents a drain opening 70. The drain opening 70 then leads either to another cavity or else to a portion of the space 50 that is not filled by a mesh.

Likewise, at least one skin may be provided with at least one drain orifice 71. Preferably, the outer skin of an acoustic wall is provided with at least one drain orifice, the outer skin not being in contact with the acoustic wave.

Furthermore, all of the holes formed in the gas ejection duct 8 with acoustic treatment may be accurately dimensioned. These holes include the above-described perforations, openings, and orifices.

Thus, each perforation 41, and possibly each drain opening and each drain orifice, presents a diameter 42 that is less than or equal to 4 millimeters.

Specifically, the Applicant has observed that a larger diameter can lead to induced sagging of a layer of powder during fabrication by laser sintering.

Under such circumstances, each cavity may be in fluid flow communication with a passage 201 passing the gas via four perforations of diameter less than or equal to 1.5 millimeters.

Furthermore, the inner and outer skins 40 and 35 may be of thicknesses that are small, while nevertheless being suitable for being obtained by laser sintering. Under such circumstances, at least one of the inner and outer skins 40 and 35 optionally presents a thickness ep of less than one millimeter.

FIGS. 6 to 9 shows a gas ejection nozzle with acoustic treatment of the invention that is provided with a skirt, a central cone, and arms.

Figure 6:
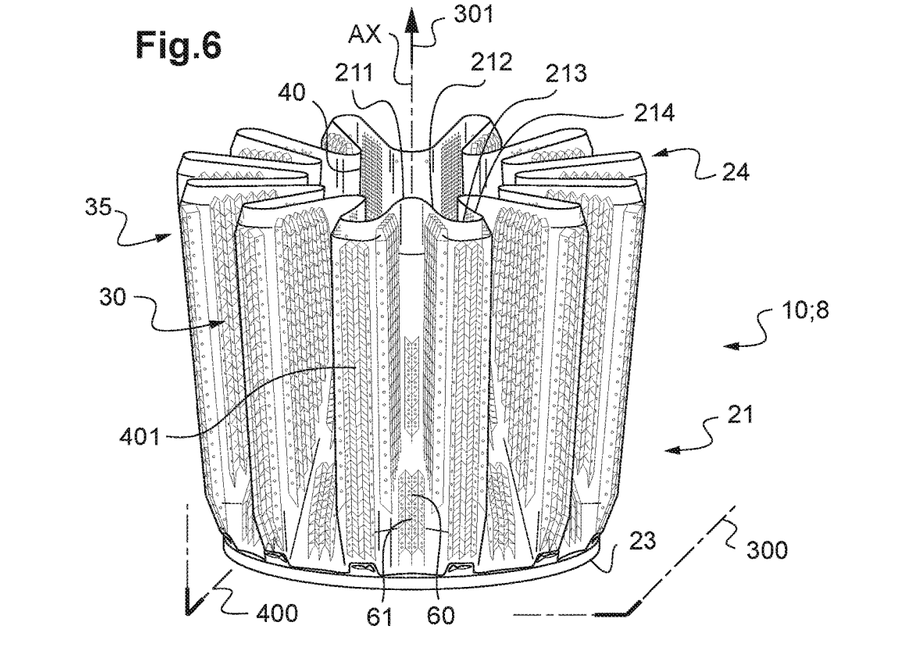
FIG. 6 is a view of a skirt for a gas ejection duct with acoustic treatment of the type comprising a gas ejection nozzle of the invention with acoustic treatment of the invention.

With reference to FIG. 6, the skirt 20 may comprise a plurality a meshes 60 extending upwards in a fabrication direction from a base 23 to a top 24.

The diverging member 21 of the skirt extends in a fabrication direction upwards from a base 23 to a top 24. Between the base 23 and its top 24, the diverging member 21 may have a periodic shape forming folds. This periodic shape has a segment that is repeated many times, the segment comprising in succession an internal arch 211, a first side 212, an external arch 213, and a second side 214. The internal arch 211 presents a convex face facing an axis of symmetry AX of the diverging member 21, while the external arch 213 presents a concave face facing the axis of symmetry AX. Under such circumstances, the first side 212 extends away from the axis of symmetry AX extending the internal arch 211 towards the external arch 213, while the second side 214 extends towards the axis of symmetry AX, extending from the external arch 213.

Under such circumstances, at least one mesh 60 may be arranged at the internal arch 211 at the first side 212, at the external arch 213, and at the second side 214.

Furthermore, FIG. 6 shows the possibility of the outer skin and the inner skin coming together locally, in particular at the base 23 and/or at the top 24 of the diverging member 21.

Figure 7:
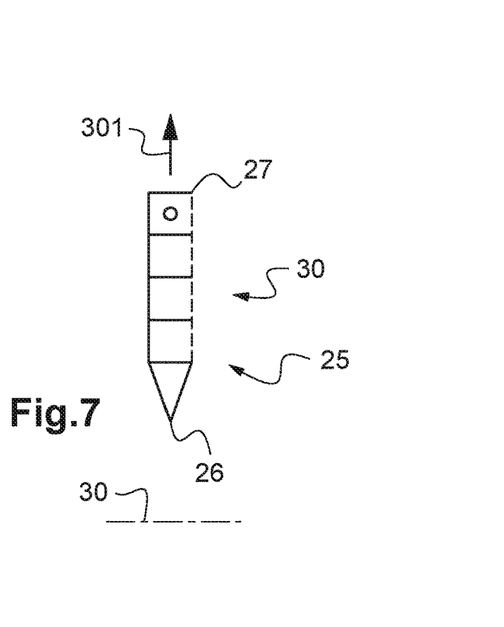
FIG. 7 is a view of an arm of a gas ejection duct with acoustic treatment of the type comprising a gas ejection nozzle with acoustic treatment.

FIG. 7 shows an arm 25 of the gas ejection nozzle 10 with acoustic treatment. This arm extends upwards in a fabrication direction from a foot 26 to an end 27, which foot 26 and end 27 may be secured to the central cone 15 and to the skirt 20 of the gas ejection nozzle 10 with acoustic treatment.

The arm may then have an acoustic wall 30 of the above-described type.

Figure 8:
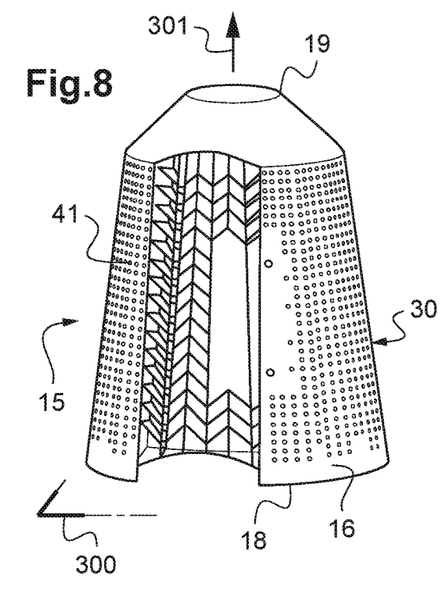
FIGS. 8 and 9 show a central cone of a gas ejection duct with acoustic treatment of the type comprising a gas ejection nozzle with acoustic treatment.
Figure 9:
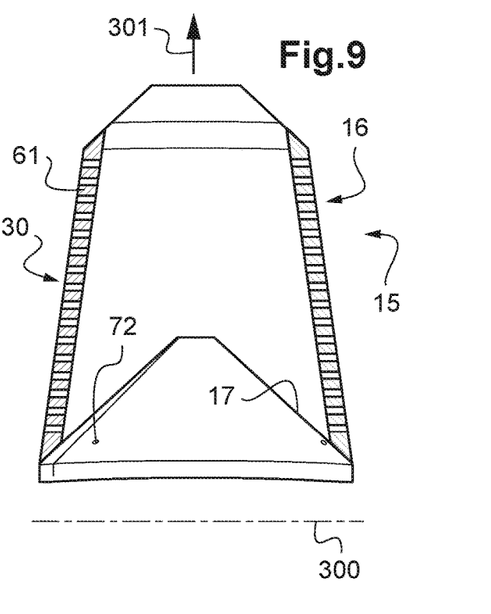

FIGS. 8 and 9 show a central cone 15.

With reference to FIG. 9, the outer converging member 16 may have an annular acoustic wall 30 of the invention.

The inner converging member 17 may possibly present only one skin forming a cone that is open at its top. This skin presents the required angle of inclination relative to the horizontal plane 300, and possibly also at least one drain orifice 72.

FIG. 10 shows a takeoff duct 9 of the invention. The takeoff duct 9 has a bend 500 followed by a diffuser 502. The bend 500 and/or the diffuser 502 may comprise acoustic walls 30 of the above-described type.

Optionally, the bend 500 and/or the diffuser 502 are fastened to a fastener flange 501.

Figure 11:
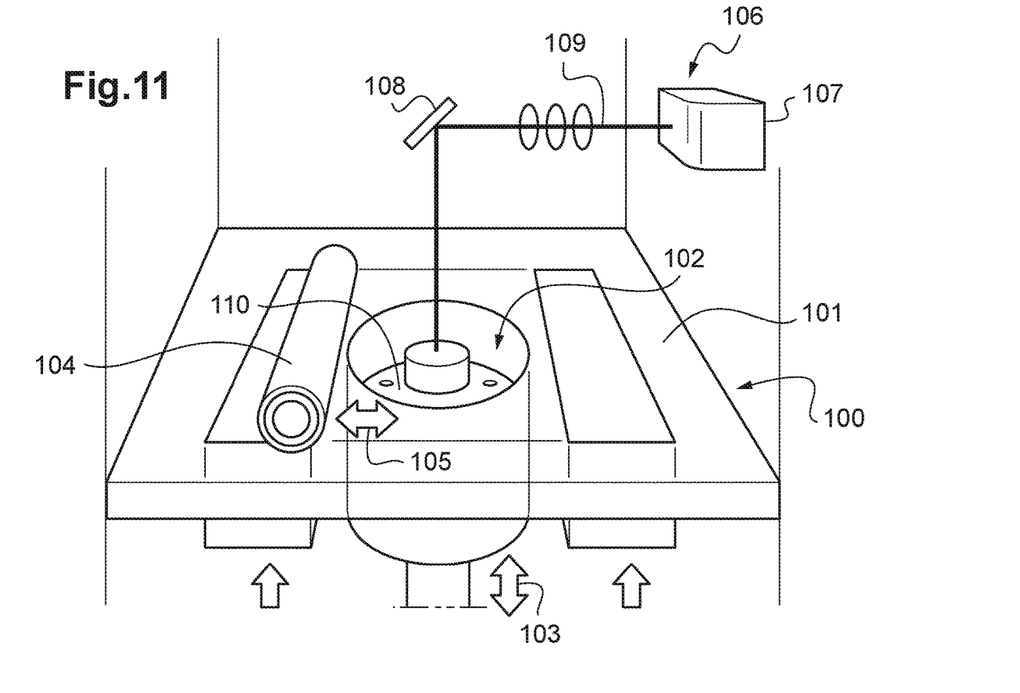
FIG. 11 is a view of a fabrication device illustrating the method of the invention.

FIG. 11 shows a device 100 for fabrication by laser sintering that enables the method of the invention to be performed.

The fabrication device 100 includes a table 101 or the equivalent. The table 101 defines a well 102. The well 102 is open at its top but it presents a bottom that is movable. The movable bottom is obtained by means of a tray 110 that is movable in elevation as represented by double-headed arrow 103.

Furthermore, the fabrication device 100 has a roller 104 rolling on the table 101 in the directions of double-headed arrow 105. The roller 104 enables successive layers of powder to be deposited in the well 102.

Furthermore, the fabrication device 100 has a laser system 106 suitable for solidifying predetermined zones of the powder deposited in the well. The laser system 106 then has at least one laser emitter 107 emitting a laser beam. Furthermore, the laser system 106 has an optical system 108 suitable for directing the laser beam into the required zones.

The fabrication device 100 also possesses an electronic system (not shown) for controlling the tray 110, the roller 104, and the laser system 106.

In the method of the invention, the gas ejection duct 8 with acoustic treatment is built up layer by layer by repeating the following steps:

using the roller 104 to deposit a layer of material in the well 102;

locally consolidating the layer by the laser system; and lowering the tray 110 supporting the gas duct 10 with acoustic treatment that is being fabricated, in order to deposit the following layer.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A gas ejection duct with acoustic treatment having at least one mechanical member, the mechanical member having at least one wall referred to as an "acoustic" wall for coming into contact with the gas, the acoustic wall having an inner skin and an outer skin spaced apart at least in part by a space, the acoustic wall including at least one internal mesh arranged in the space, the mesh defining a plurality of cavities, each cavity extending in the thickness direction from the inner skin to the outer skin, the inner skin being for coming into contact with the gas, the inner skin having perforations, each cavity communicating with at least one perforation, wherein each cavity is of parallelepiped shape, each cavity being defined in elevation by a partition referred to as "top" partition and a partition referred to as a "bottom" partition, each cavity being defined transversely by a partition referred to as a "left side" partition and a partition referred to as a "right side" partition which extend in elevation from the bottom partition to the top partition, each cavity being defined transversely in thickness by a non-perforated portion of the outer skin and a perforated portion of the inner skin, at least one of the partitions of a cavity presenting a drain opening opening out to outside the cavity, wherein the gas ejection duct with acoustic treatment extends in elevation from a base to a top, the inner wall and the outer wall and each mesh extend in elevation relative to a fabrication plane referred to as the "horizontal" plane that is tangential to the base, each mesh extends in elevation in a direction referred to as the "fabrication direction" presenting an acute angle greater than or equal to a predetermined angle relative to the horizontal plane, and each of the inner and outer walls presents an acute angle of inclination relative to the horizontal plane that is greater than or equal to the predetermined angle.

2. The gas ejection gas duct with acoustic treatment according to claim 1, wherein the predetermined angle is equal to 45 degrees.

3. The gas ejection gas duct with acoustic treatment according to claim 1, wherein each tangent to either one of the inner and outer skins that is arranged in a plane perpendicular to the horizontal plane presents a said angle of inclination.

4. The gas ejection duct with acoustic treatment according to claim 1, wherein the cavities of a mesh are arranged in elevation one above another, and transversely one beside another.

5. The gas ejection duct with acoustic treatment according to claim 1, wherein each of the partitions is rectangular.

6. The gas ejection duct with acoustic treatment according to claim 1, wherein each cavity has the shape of a non-rectangular parallelepiped, each of the bottom and top partitions presenting an acute angle not equal to 90 degrees relative to the left side partition or the right side partition.

7. The gas ejection duct with acoustic treatment according to claim 1, wherein the acoustic wall is made out of the NiCr19Fe19Nb5Mo3 material.

8. The gas ejection duct with acoustic treatment according to claim 1, wherein at least one of the inner and outer walls presents a thickness less than one millimeter.

9. The gas ejection duct with acoustic treatment according to claim 1, wherein each perforation presents a diameter less than or equal to four millimeters.

10. The gas ejection duct with acoustic treatment according to claim 1, wherein each cavity communicates with at least four perforations with a maximum diameter of 1.5 millimeters.

11. The gas ejection duct with acoustic treatment according to claim 1, wherein the gas ejection duct with acoustic treatment is a nozzle and each mechanical member is selected from a list comprising a skirt, a central cone, and an arm connecting the skirt to the central cone.

12. The gas ejection duct with acoustic treatment according to claim 1, wherein the gas ejection duct with acoustic treatment includes at least one skin having at least one drainage orifice.

13. An aircraft provided with a gas ejection duct with acoustic treatment, wherein the gas ejection duct with acoustic treatment is according to claim 1.

14. A method of fabricating a gas ejection duct with acoustic treatment having at least one mechanical member, the mechanical member having at least one wall referred to as an "acoustic" wall for coming into contact with the gas, the acoustic wall having an inner skin and an outer skin spaced apart at least in part by a space, the acoustic wall including at least one internal mesh arranged in the space, the mesh defining a plurality of cavities, each cavity extending in the thickness direction from the inner skin to the outer skin, the inner skin being for coming into contact with the gas, the inner skin having perforations, each cavity communicating with at least one perforation, wherein each cavity is of parallelepiped shape, each cavity being defined in elevation by a partition referred to as "top" partition and a partition referred to as a "bottom" partition, each cavity being defined transversely by a partition referred to as a "left side" partition and a partition referred to as a "right side" partition which extend in elevation from the bottom partition to the top partition, each cavity being defined transversely in thickness by a non-perforated portion of the outer skin and a perforated portion of the inner skin, at least one of the partitions of a cavity presenting a drain opening opening out to outside the cavity, wherein the gas ejection duct with acoustic treatment is made by performing a laser sintering method, the gas ejection duct with acoustic treatment being built up layer by layer by repeating the following steps:

using a roller to deposit a layer of material;
locally consolidating the layer; and
lowering a tray supporting the gas ejection duct with acoustic treatment that is being fabricated.

15. The method of fabricating a gas ejection duct with acoustic treatment according to claim 14, wherein the gas ejection duct with acoustic treatment extends in elevation from a base to a top, the inner wall and the outer wall and each mesh extend in elevation relative to a fabrication plane referred to as the "horizontal" plane that is tangential to the base, each mesh extends in elevation in a direction referred to as the "fabrication direction" presenting an acute angle greater than or equal to a predetermined angle relative to the horizontal plane, and each of the inner and outer walls presents an acute angle of inclination relative to the horizontal plane that is greater than or equal to the predetermined angle.

16. The method of fabricating a gas ejection gas duct with acoustic treatment according to claim 14, wherein the predetermined angle is equal to 45 degrees.

17. The method of fabricating a gas ejection gas duct with acoustic treatment according to claim 14, wherein each tangent to either one of the inner and outer skins that is arranged in a plane perpendicular to the horizontal plane presents a said angle of inclination.

18. The method of fabricating gas ejection duct with acoustic treatment according to claim 14, wherein the cavities of a mesh are arranged in elevation one above another, and transversely one beside another.

19. The method of fabricating a gas ejection duct with acoustic treatment according to claim 14, wherein each of the partitions is rectangular.

20. The method of fabricating gas ejection duct with acoustic treatment according to claim 14, wherein the acoustic wall is made out of the NiCr19Fe19Nb5Mo3 material.

* * * * *